United States Patent [19]

Rosén

[11] Patent Number: 4,829,513
[45] Date of Patent: May 9, 1989

[54] TIME SLOT SUMMATION COMMUNICATION SYSTEM FOR ALLOWING CONFERENCE CALLS

[76] Inventor: Paul G. W. Rosén, Fagerviksvägen 23, 161 51 Bromma, Sweden

[21] Appl. No.: 27,656

[22] Filed: Mar. 19, 1987

[30] Foreign Application Priority Data

Mar. 19, 1986 [SE] Sweden .............................. 8601287

[51] Int. Cl.[4] ............................................ H04Q 11/04
[52] U.S. Cl. ...................................................... 370/62
[58] Field of Search ................... 370/62; 379/202, 203, 379/204, 205

[56] References Cited

U.S. PATENT DOCUMENTS

| | | | |
|---|---|---|---|
| 3,983,332 | 9/1976 | Patten | 370/62 |
| 3,991,279 | 11/1976 | Morgan et al. | 379/202 |
| 4,049,920 | 9/1977 | Knollman | 379/202 |
| 4,059,735 | 11/1977 | Betts | 370/62 |
| 4,305,149 | 12/1981 | Harrison | 370/62 |
| 4,486,879 | 12/1984 | Baltz | 370/62 |
| 4,499,577 | 2/1985 | Baranyai et al. | 370/62 |
| 4,606,021 | 8/1986 | Wurst | 370/62 |

FOREIGN PATENT DOCUMENTS

| | | | |
|---|---|---|---|
| 3223033 | 12/1983 | Fed. Rep. of Germany | 379/204 |
| 3305922 | 8/1984 | Fed. Rep. of Germany | 379/202 |
| 2530903 | 1/1984 | France | 370/62 |

*Primary Examiner*—A. D. Pellinen
*Assistant Examiner*—Geoffrey S. Evans
*Attorney, Agent, or Firm*—Burns, Doane, Swecker & Mathis

[57] ABSTRACT

A communication system which includes a plurality of communication units that are coupled together by a physical conductor. Each unit is provided with a loudspeaker for receiving auditive information and/or a microphone for transmitting auditive information. Certain of the units are allotted a group assignment and are arranged to establish a conference call facility, whereby an analog signal derived from transmitted auditive information is subjected to a sampling process. For the purpose of transmitting auditive information and/or for receiving auditive information, all of the units associated with the group are arranged to utilized one and the same time slot in a time frame used for the sampling process, such that when information is transmitted simultaneously from two or more units, the sampling contributions are summed within time slots via the physical conductor.

20 Claims, 1 Drawing Sheet

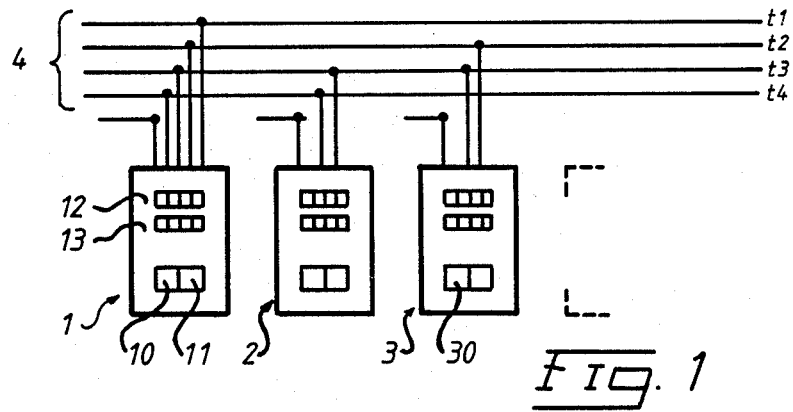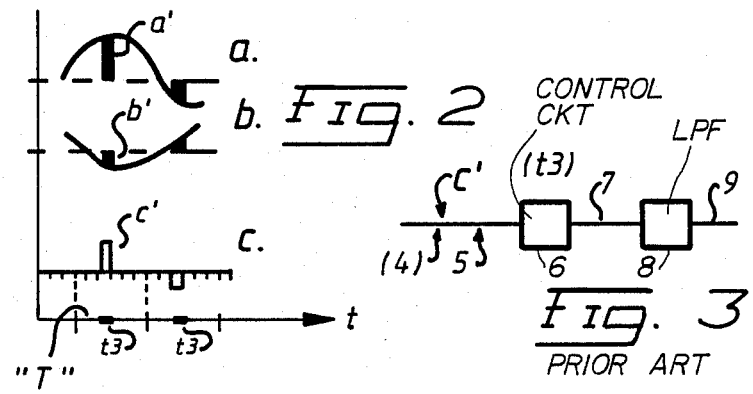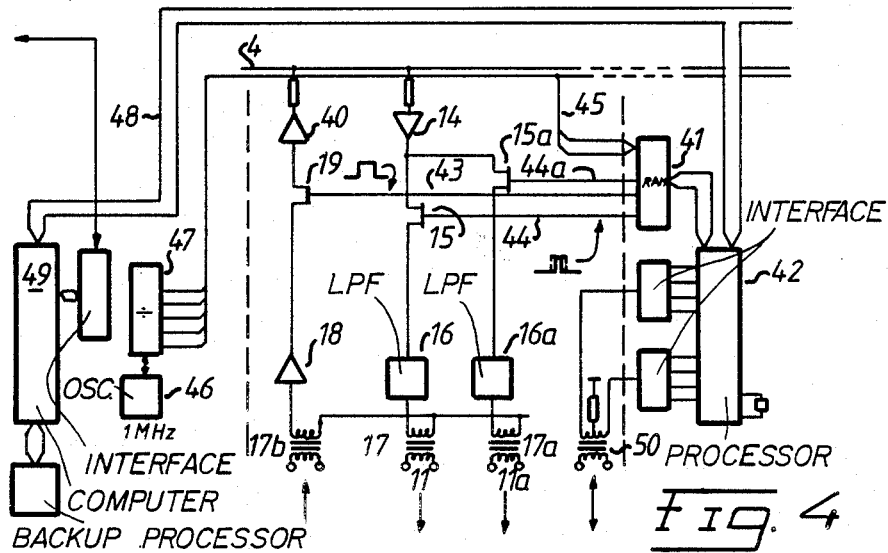

TIME SLOT SUMMATION COMMUNICATION SYSTEM FOR ALLOWING CONFERENCE CALLS

BACKGROUND OF THE INVENTION

The present invention relates to a communication system, and more specifically, although not exclusively, to a communication system which incorporates a plurality of communication units all of which, or selected ones of which, can be assigned a common conference call facility, therewith to enable all communication units assigned to said facility to transmit and to receive auditive messages simultaneously therebetween.

The device which interlinks the communication units of the inventive communication system preferably has the form of a physical conductor.

Respective units incorporate first means for receiving auditive information and/or second means for transmitting auditive information.

In order to utilize the conference call facility of the inventive communication system, a given number of the aforesaid communication units are allotted a group assignment and are adapted to co-act with one another in a manner to establish a conference call facility.

The invention is also based on the concept that an analog signal derived from auditive information transmitted from any one of the aforesaid units is sampled prior to being received as sampled information in a further unit, and that in dependence on the sampling contribution, the information or data derived from the sampling contribution is converted to auditive information.

Several types of communication systems of this kind are known in the art. For example, it is known to establish a conference call facility in communication systems of this kind by assigning to certain communication units a particular group status, by connecting said units to a physical conductor which is common to all units in the group, and to connect all units to this conductor during a conference call and therewith pass along the conductor an analog signal that corresponds to an overlay of the pieces of auditive information or data to be transmitted.

Thus, it is possible with such a system to transmit information simultaneously from a plurality of communication units and to receive this information simultaneously in a plurality of further communication units.

In systems such as these, a physical conductor is required for each group of units needed to establish a conference call facility.

Consequently, systems which incorporate static conductors for the purpose of interlinking the various groups of communication units are relatively inflexible, since when wishing to switch the assignment of a unit, from one group to another, or requiring a unit to serve more than one group at one and the same time, it is necessary to incorporate additional physical conductors between all units belonging to one or more groups.

SUMMARY OF THE INVENTION

It will be seen from the aforediscussed prior art that one technical problem prevailing within this field resides in readily establishing a conference call facility in a communication system which incorporates a plurality of communication units which are mutually connected or interlinked by coupling means in the form of a physical conductor.

A further, qualified technical problem prevailing in communication systems of the aforesaid kind is one of providing a conference call facility that will be cost effective, which means that the individual communication units shall be capable of being standardized irrespective of the group to which they are assigned, and that the coupling means between the various units can be physical electrical conductors, such as a co-axial cable.

A further technical problem resides in the provision of conditions with the aid of simple means by which the auditive information can be processed in a sampling action, and with which all communication units incorporated in the system can be synchronized in a well defined manner.

It will also be seen that another technical problem in this regard is one of creating conditions with the aid of simple means which will enable a communication unit of a group to be switched from an information transmitting mode to an information receiving mode, or vice versa.

A further problem is one of creating, with the aid of simple means, conditions by which the group assignment of a particular communication unit can be controlled and determined from a central control unit, and by which changes in the pattern of group assignment can be readily carried out.

It will also be seen that a further technical problem resides in the creation of conditions by which each unit can readily choose its own group assignment and, within certain limits, also assign itself to other groups, so as to be able to transmit common information to specific units and to receive information from specific units in selectible individual groups, and also to create conditions for listening to information transmitted simultaneously from one or more communication units within different groups. Finally, another technical problem in the present context is one of creating with the aid of simple means, conditions which will enable the number of groups to be increased over and above the number accommodated within a time frame in a sampling process.

In accordance with the invention one or more of the aforesaid technical problems are resolved with the aid of a communication system which incorporates in a known manner a physical electrical conductor, such as a coaxial cable which interlinks the respective communication units in the system.

The respective units of the inventive communication system incorporates a first means for receiving auditive information and/or second means for transmitting auditive information. Certain of the units among a plurality of units belonging to the communication system as a whole are assigned to a group, e.g. allotted a group assignment, so that all units belonging to the group can be caused to establish a conference call facility with the aid of simple means.

Finally, the invention is based on the known feature of such prior art communication systems in which an analog signal derived from auditive information is sampled with the aid of a sampling process, either a sampling process of the future or of a known sampling process of today.

In accordance with the invention all of the units assigned to the group are adapted to mutually use the same time slot in a time frame utilized for transmitting and/or receiving the auditive information. Thus, when transmitting information simultaneously from two or more groups of associated communication units, the respective sampling contributions are added together, or summed on the coupling means or conductor and transmitted thereby, whereby pluralities of information can be evaluated simultaneously via the first means of respective units belonging to said group and be held there as multi-information overlays.

The invention is also used in the case when solely one unit adopts a transmitting mode.

The invention is particularly based on the concept that only one electrical physical conductor need be used as the aforesaid coupling means and that this conductor can be caused to transfer information or summed information applicable to different groups of units within different time slots.

Each unit advantageously has first means for receiving information transferred by the coupling means, and second means for transmitting information over said means, the first means comprising an amplifier which is connected to a low-pass filter over a first control circuit and the second means comprises an amplifier which is connected to the coupling means over a second control circuit.

For transmission purposes the second control circuit is activated during the relevant time slot common to the communication units in the receiving group, while for receiving purposes the first control circuit is activated during the common time slot in question.

The first and second control circuits of one and the same communication unit are activated and de-activated via a RAM-memory and a processor assigned to the unit.

According to another embodiment of the invention all units are synchronized via an oscillator which is located externally of the units. Furthermore, the read pulses transmitted by the RAM-memory shall have a time duration which is shorter than the duration of the sampling pulses. It is proposed that the read pulses constitute 75% of the duration of the sampling pulses and are centralized thereto.

Finally, in accordance with one advantageous embodiment the number of conductors provided is increased to two or more, with a corresponding increase in the number of RAM-memories, so as to increase the number of groups available.

The advantages primarily afforded by a communication system constructed in accordance with the invention reside in the fact that communication units that have a particular group assignment can be connected to form a conference call facility in a cost effective manner, and that the units are so constructed that they themselves, or through the agency of a central control unit, can readily switch to a further group assignment.

In accordance with one embodiment of the invention, a communication system is disclosed which includes, for the purpose of transmitting auditive information and/or for receiving auditive information, communication units which are arranged to utilize the same time slot in a time frame utilized for the sampling process, so that when information is transmitted simultaneously from two or more units, the sampling contributions are summed within time slots via a coupling means, such that a plurality of information signals can be evaluated simultaneously via first means of said unit for receiving auditive information.

BRIEF DESCRIPTION OF THE DRAWINGS

An exemplary preferred embodiment of a communication system incorporating characteristic features of the present invention will now be described with reference to the accompanying drawings, in which FIG. 1 is a highly simplified illustration of a communication system which comprises a plurality of communication units and solely one coupling means which inter-links the communication units;

FIG. 2 is a highly simplified illustration of the principles employed for sampling two simultaneous analogue signals;

FIG. 3 illustrates schematically a known circuit which, in response to a sampling contribution from a sampling process, converts the information significant to the sampling contribution to auditive analog information; and FIG. 4 is a simplified circuit diagram of a unit constructed in accordance with the invention.

DETAILED DESCRIPTION OF PREFERRED EMBODIMENTS

Thus, FIG. 1 is a simplified illustration of a communication system which may comprise any preferred number of mutually identical communication units. Three such units are illustrated in FIG. 1, and are referenced 1, 2 and 3 for illustration purposes.

The units are interlinked by means of a single electrical physical conductor 4, as shown in FIG. 1, having four lines, each of which represents a time slot "t1", "t2", "t3" and "t4", applicable to one part of a time frame used in a sampling process.

It will be understood that the number of time slots in a sampling process is much greater than four, and that the illustrated limited number of time slots has been shown purely to simplify the illustration.

Since the communication units are of mutually identical construction, the following description will be made solely with reference to the unit 1.

The unit 1 incorporates first means 10 for receiving auditive information, said means comprising a loudspeaker. The unit also incorporates second means 11 for transmitting auditive information, said means having the form of a microphone.

Certain of the aforesaid communication units are allotted a group assignment, such as to establish a conference call facility therewith, which is illustrated in FIG. 1 by connecting the unit 1 to all groups or units, by utilizing each time slot "t1"–"t4". The unit 2 is accorded access solely to the time slots "t3" and "t4", while the unit 3 is accorded access to the time slots "t2" and "t3". This means that with regard to the time slot "t3" the units 1, 2 and 3 belong to the same group assignment. With regard to the time slot "t2", the unit 1 and the unit 3 have the same group assignment, while with regard to the time slot "t4" the unit 1 and the unit 2 have the same group assignment.

Although this has been illustrated in FIG. 1 with the aid of separate lines, it will be understood that there is used in practice one single physical conductor, for example in the form of a co-axial conductor.

When using a single physical conductor, the number of different group structures that can be formed is restricted to the number of time slots available in the time frame.

The number of group structures possible, however, can be increased by using two or more physical conductors. In this case, each communication unit is constructed to transmit and/or to receive signals within pre-determined time slots applicable to a selected conductor among all available conductors. This will be described in more detail hereinafter.

The invention is based on the concept of sampling an analog signal derived from auditive information and transmitted from each transmitter unit, and passing out the sampling contribution on the conductor 4 within a pre-selected time slot. This will be described in more detail with reference to FIG. 2.

If it is assumed that the unit 1 transmits a message containing auditive information with the curve form referenced "a" in FIG. 2, while the unit 2 simultaneously therewith transmits auditive information illustrated by the curve reference "b" in FIG. 2, it will be evident that in the case of a sampling process the signal "a" will provide a large positive contribution during a time section "t3", this contribution being referenced "a'", while the signal "b" will provide a small negative contribution, referenced "b'".

When these two contributions from the units 1 and 2 are combined during the time section "t3", there is obtained during the time section "t3" a contribution which comprises the sum of these two contributions "a'" and "b'", this sampling contribution summation being referenced "c'".

The sampling contributions are summed on the line 4, by applying said contributions to the line or conductor during the same time slot "t3".

The resultant contribution "c'" thus occurs within the third time slot applicable to a time frame T. A sampling contribution summation is established in a similar manner for the third time slot associated with the next time frame, and so on.

For each such time frame, the contribution in the analog signal "a" and the analog signal "b" for each third time slot "t3" is transferred via the conductor 4, and this signal "c'" illustrated in FIG. 3 arrives on a conductor 5 and is applied to a control circuit 6, which can be activated solely during the time slot "t3" in question for each time frame, and the selected sampling contribution is connected, via a conductor 7, to a low-pass filter 8, the output analog signal 9 of which is applied to a loudspeaker.

It is now assumed that the communication unit 3 also belongs to the group and constitutes the receiver unit for receiving the two signals transmitted simultaneously from the units 1 and 2, and consequently the analog signal on the conductor 9 will be applied to the loudspeaker 30 belonging to the unit 3.

It can thus be established that if the units 1 and 2 transmit simultaneously an auditive analog signal which is sampled during one and the same time slot, the unit 3 will receive these sampled signals during the same time slot and convert said signals to an auditive analogue signal.

If solely one communication unit 1 transmits an auditive signal, this signal can be sampled and converted in a manner similar to an audible analog signal from both the unit 2 and the unit 3.

As will be understood, it lies within the scope of the invention for the communication unit 1 to transmit its information during one time slot and for the unit 2 to transmit its information during a further time slot, and for the unit 3 to listen to the information transmitted from the two units 1 and 2 via two separate loudspeakers.

It also lies within the scope of the invention for one or more units to comprise means solely for listening to a conversation within solely one time slot, within a plurality of time slots, or within all of the time slots.

Thus, the present invention enables all of the units belonging to the group, in the illustrated case the units 1, 2 and 3, to transmit auditive information and/or to receive auditive information while using one and the same time slot, namely the time slot "t3", in a time frame T used for the sampling process, so that when information is transmitted simultaneously from, for example, two units 1 and 2, the sampling contributions are summed and the summed signal is transmitted over the conductor 4, so that plurality of information can be evaluated simultaneously via the loudspeaker 30 of the unit 3. As will be seen in FIG. 1, the arrangement incorporates a row of first buttons 12 by means of which the time slot or slots in which auditive information is to be transmitted can be selected, and a second row of buttons 13 by means of which it is possible to select the time slot or slots within which the unit 1 can receive auditive information transmitted by other units associated with the group.

Thus, with this arrangement the group assignment can be selected in an extremely simple manner, both with regard to receiving auditive information from various groups and with regard to transmitting auditive information to selected groups.

It is also obvious that different information applicable to different groups of units can be transmitted within different time slots, normally thirty two time slots, over one single physical conductor 4.

Thus, the first time slot can contain information from one or more units belonging to a first group, and the second time slot can contain information from one or more units belonging to a further group, and so on.

Each unit belonging to the first group is able to listen to the information transferred within the first time slot, and each unit belonging to the second group is able to listen to information transferred within the second time slot, and so on.

A unit can be permitted access to a plurality of groups and time slots.

This renders the system highly flexible.

FIG. 3 illustrates in more detail a principle coupling diagram applicable to each of the communication units, and then particularly to the unit referenced 1 in FIG. 1.

Thus, each unit incorporates first means, in the form of an amplifier 14, which is connected via a first control circuit 15 to a low-pass filter 16, so as to be able to transmit auditive analogue information to the loudspeaker 11, via a transformer 17.

As will be seen from FIG. 4, the arrangement includes a receiver circuit which comprises two mutually parallel circuits, such that the first control circuit 15 will include a parallel-coupled similar control circuit 15a and a low-pass filter 16a, similar to the low-pass filter 16, which is connected to a transformer 17a, which in turn transmits auditive information to a loudspeaker 11a.

All information that originates from all of the groups and is present on the conductor 4 is, in principle, available to the amplifier 14, although information is solely taken out during one and the same time slot, via the control circuit 15, thereby obtaining the information applicable to a first group.

Information which is available solely during a second time slot is taken out via a control circuit 15a, one and the same time slot for each time frame being applicable for another group.

Thus, the information from a first group can be heard in one receiver or earphone, while information from another group can be heard from a loudspeaker, or alternatively in the right and left ear of a person listening to both information transmissions.

The second means also comprises a transformer 17b connected to a matching amplifier 18 which is coupled to the conductor 4 via a second control circuit 19 which is activated solely during the time slot in question. The second control circuit is preferably coupled to the conductor 4 over an amplifier 40.

It will be understood that within the scope of the invention the control circuit 19 can be steered so that one and the same output analog signal through the amplifier 18 is sampled in a plurality of time slots for transmission to several groups.

It is preferred in accordance with the invention that the amplifier 40 has a high ohmic output and operates as a constant current amplifier against a conductor 4, which can be considered to be low ohmic.

The first control circuits 15, 15a and the second control circuit 19 are activated and de-activated by a RAM-memory 41 and a processor 42 allotted to the unit 1.

Sampling pulses or read pulses are generated via the RAM-memory 41, via conductors 43 and conductors 44, 44a, respectively.

Furthermore, it shall be ensured that, via the RAM-memory 41, the read pulses obtain a shorter duration in time than the length of the sampling pulse, and that the read pulse is centralized in and surrounded by the sampling pulse. This has been illustrated with the pulse notations in FIG. 4.

The RAM-memory 41 is controlled in a known manner, via a conductor 45, by an oscillator 46, with the aid of a frequency divider 47.

The processor 42 can be connected to an external computer 49, via an address and a databus 48, for configuring pre-programmed conference connections.

The press buttons 12 and 13 are connected to the processor 42, via a transformer 50, for activation of the RAM-memory 41 to cause transmission of sampling and read pulses within the time slots indicated by the setting of the push buttons.

The transfer signals from the buttons 12 and 13 may comprise any previously known signal transfer, although a data transfer in serial form is preferred, for example DTMF.

Returning to the embodiment which incorporates an increased number of groups over and above the number of time slots in a time frame, and to the recommendation of utilizing therewith two or more conductors 4, it may be possible to apply transmitted information from a unit as sampling contribution to two or more conductors within one and the same time slot. In this case, there is required for separation in a receiving unit a RAM-memory for each conductor and a similar control to that previously described.

The information transmitted as a sampling contribution from one unit may, of course, also be applied to two or more conductors within different time slots for the conductors concerned. A RAM-memory for each conductor will also be required in this case.

It will be understood that the invention is not restricted to the exemplifying embodiment described above with reference to the drawings, and that modifications can be made within the scope of the invention defined in the following claims.

We claim:

1. A communication system comprising a plurality of communication units which are mutually interlinked by couplings means in which respective units comprise first means for receiving auditive information and/or second means for transmitting auditive information, and in which certain units are allotted a group assignment and are arranged to establish a conference call facility, and in which an analog signal derived from transmitted auditive information is sampled, characterized in that for the purpose of transmitting auditive information and/or for receiving auditive information, the communication units of all groups are arranged to utilize the same time slot in a time frame utilized for the sampling process, so that when information is transmitted simultaneously from two or more units, the sampling contributions are summed within time slots via said coupling means, such that a plurality of information signals can be evaluated simultaneously via the first means of said unit.

2. A communication system according to claim 1, characterized in that said coupling means includes a single physical conductor wherein different information signals applicable to different groups of units are transmitted via said single physical conductor serving as a unit-interlinking means.

3. A communication system according to claim 1, characterized in that the first means comprises an amplifier which is connected to a low-pass filter via a first control circuit.

4. A communication system according to claim 1, characterized in that the second means comprises an amplifier which is connected to the coupling means via a second control circuit.

5. A communication system according to claim 1, characterized in that said first means comprises a first control circuit and said second means comprises a second control circuit whereby the first and the second control circuits are activated and de-activated via a RAM-memory and a processor belonging to the unit.

6. A communication system according to claim 1, characterized in that all units are synchronized via an oscillator positioned externally of the units.

7. A communication system according to claim 5, characterized in that there is used two or more conductors with two or more RAM-memories for the purpose of increasing the number of available groups.

8. A communication system according to claim 1, characterized in that there is used two or more conductors with two or more RAM-memories for the purpose of increasing the number of available groups.

9. A communication system according to claim 3, characterized in that the second means comprises an amplifier which is connected to the coupling means via a second control circuit.

10. A communication system according to claim 4, characterized in that said first means comprises a first control circuit whereby the first and second control circuits are activated and de-activated via a RAM-memory and a processor belonging to the unit.

11. A communication system according to claim 9, characterized in that the first and second control circuit are activated and de-activated via a RAM-memory and a processor belonging to the unit.

12. A communication system according to claim 2, characterized in that reading pulses transmitted by a RAM-memory have a time duration which is shorter than the duration of the sampling pulses and is centralized thereto.

13. A communication system according to claim 3, characterized in that reading pulses transmitted by a RAM-memory have a time duration which is shorter than the duration of the sampling pulses and is centralized thereto.

14. A communication system according to claim 4, characterized in that reading pulses transmitted by a RAM-memory have a time duration which is shorter than the duration of the sampling pulses and is centralized thereto.

15. A communication system according to claim 5, characterized in that reading pulses transmitted by the RAM-memory have a time duration which is shorter than the duration o the sampling pulses and is centralized thereto.

16. A communication system according to claim 6, characterized in that reading pulses transmitted by a RAM-memory have a time duration which is shorter than the duration of the sampling pulses and is centralized thereto.

17. A communication system according to claim 2, characterized in that there is used two or more conductors with two or more RAM-memories for the purpose of increasing the number of available groups.

18. A communication system according to claim 3, characterized in that there is used two or more conductors with two or more RAM-memories for the purpose of increasing the number of available groups.

19. A communication system according to claim 4, characterized in that there is used two or more conductors with two or more RAM-memories for the purpose of increasing the number of available groups.

20. A communication system comprising a plurality of communication units which are mutually interlinked by coupling means in which respective units comprise first means for receiving auditive information and/or second means for transmitting auditive information, and in which certain units are allotted a group assignment and are arranged to establish a conference call facility, and in which an analog signal derived from transmitted auditive information is sampled, characterized in that for the purpose of transmitting auditive information and/or for receiving auditive information, the communication units of all groups are attached to utilize the same time slot in a time frame utilized for the sampling process, so that when information is transmitted simultaneously from two or more units, the sampling contributions are summed within time slots via said coupling means, such that a plurality of information signals can be evaluated simultaneously via the first means of said unit, said system being further characterized in that reading pulses transmitted by a RAM-memory have a time duration which is shorter than the duration of the sampling pulses and is centralized thereto.

* * * * *